United States Patent
Hanatatsu

(10) Patent No.: US 8,646,986 B2
(45) Date of Patent: Feb. 11, 2014

(54) PIVOT ASSEMBLY BEARING

(75) Inventor: Hiroyuki Hanatatsu, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 0 days.

(21) Appl. No.: 13/452,184

(22) Filed: Apr. 20, 2012

(65) Prior Publication Data

US 2012/0275732 A1 Nov. 1, 2012

(30) Foreign Application Priority Data

Apr. 28, 2011 (JP) ................................ 2011-101146

(51) Int. Cl.
*F16C 27/00* (2006.01)

(52) U.S. Cl.
USPC ....................................................... 384/535

(58) Field of Classification Search
USPC ......... 384/537, 538, 539, 561, 584, 626, 903, 384/535, 543, 581, 585; 360/265.2, 265.4, 360/265.6
See application file for complete search history.

(56) References Cited

U.S. PATENT DOCUMENTS

| | | | | |
|---|---|---|---|---|
| 2,510,659 A * | 6/1950 | Ristow | | 384/512 |
| 4,325,590 A * | 4/1982 | Pethis | | 384/518 |
| 4,810,108 A * | 3/1989 | Yajima | | 384/488 |
| 6,655,847 B2 * | 12/2003 | Obara et al. | | 384/535 |
| 7,580,225 B2 * | 8/2009 | Hanrahan et al. | | 360/265.6 |
| 8,021,072 B2 * | 9/2011 | Court et al. | | 403/372 |
| 8,376,626 B2 * | 2/2013 | Tsuchiya | | 384/585 |
| 2002/0118490 A1 | 8/2002 | Macpherson et al. | | |
| 2005/0225903 A1 * | 10/2005 | Sprankle et al. | | 360/264.3 |

FOREIGN PATENT DOCUMENTS

JP 01264726 A * 10/1989 ............. B23P 11/00
JP A-2004-513309 4/2004
JP A-2007-305268 11/2007

* cited by examiner

*Primary Examiner* — Phillip A Johnson
(74) *Attorney, Agent, or Firm* — Oliff PLC

(57) ABSTRACT

A pivot assembly bearing capable to decrease the pressing force when it is pressed into a mounting hole of a swing arm and to prevent the formation of particles on the outer circumferential surface of a sleeve of pivot assembly bearing is provided. The pivot assembly bearing comprises a shaft, and a sleeve 13 rotatably supported around the shaft, a plurality of grooves extending along a circumferential direction are successively formed in an axial direction on an outer circumferential surface of the sleeve 13, and the surface roughness of the outer circumferential surface of the sleeve 13 is 0.5 to 8 μm in terms of center line average roughness (Ra) and 5 to 30 μm in terms of maximum height (Rmax).

19 Claims, 2 Drawing Sheets

Fig. 1A
Fig. 1B
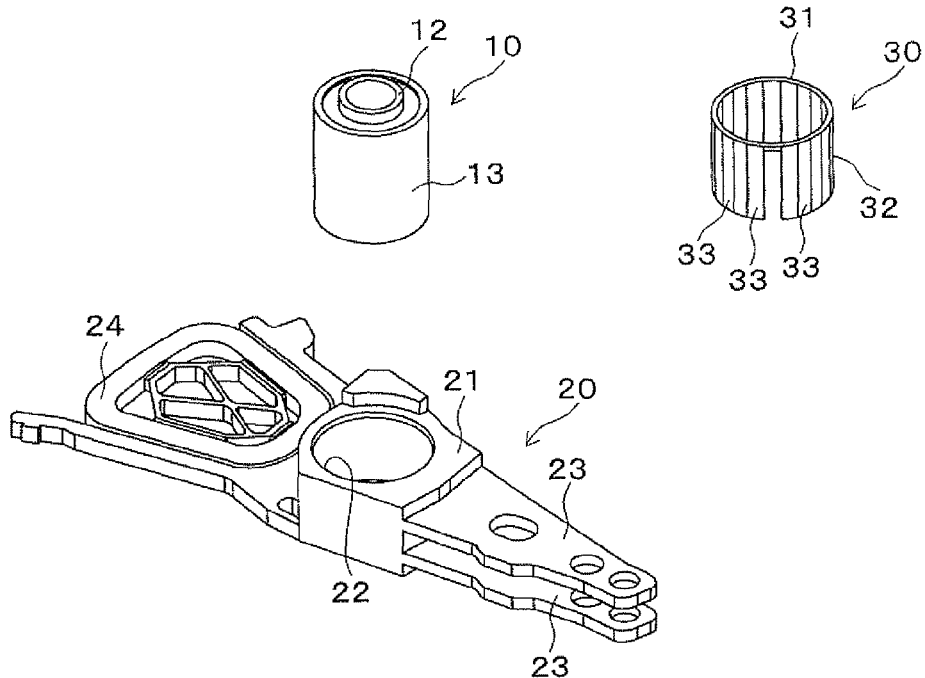
Fig. 2
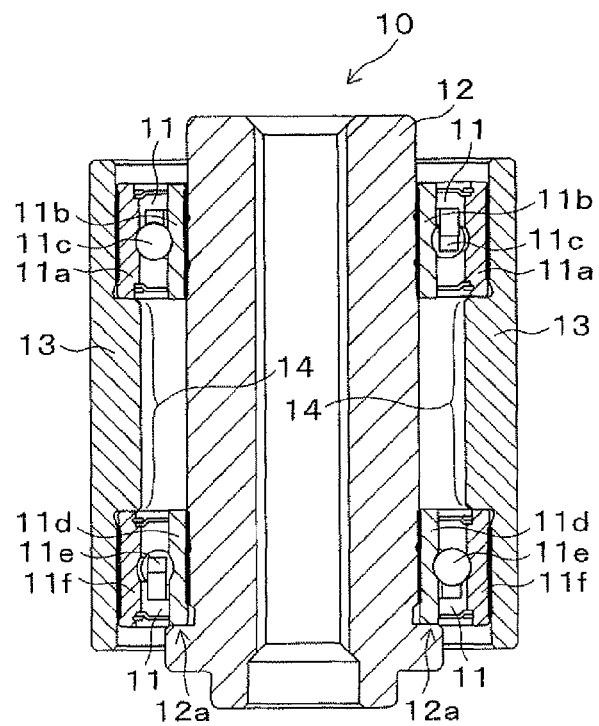

PIVOT ASSEMBLY BEARING

BACKGROUND OF THE INVENTION

1. Field of the Invention

The present invention relates to a pivot assembly bearing used in a hard disk drive unit, and in particular, relates to a technique which reduces the pressing force when the pivot assembly bearing is pressed into a mounting hole of a swing arm.

2. Description of Related Art

FIG. 5 is a perspective view showing a conventional hard disk drive unit D which is one example of the storage devices for a computer. In the hard disk drive unit D shown in this figure, a magnetic head 4 mounted on the tip of a swing arm 3 swingably supported by a pivot assembly bearing 1 is moved on a magnetic disk 5, whereby information is recorded on the magnetic disk 5 and recorded information is read out from the magnetic disk 5. The pivot assembly bearing 1 generally has a structure in which a pair of ball bearings is arranged between a shaft and a sleeve surrounding the shaft, and it is fitted to a mounting hole 2a provided on a base portion 2 of the swing arm 3.

However, there is a problem related to the fabrication tolerance when the pivot assembly bearing 1 is pressed into the mounting hole 2a. In the case in which the diameter size of the sleeve which corresponds to the outermost part of the pivot assembly bearing 1 approximates the upper limit of the fabrication tolerance and the bore size of the mounting hole 2a approximates the lower limit of the fabrication tolerance, the sleeve is deformed since the press-fit interference is too large, and great pressing force is required during pressing thereinto. Furthermore, metallic powder or shavings may be generated by chipping away an outer circumferential surface of the sleeve or an inner circumferential surface of the mounting hole 2a. It should be noted that the metallic powder or the shavings generated as described above are called "particles" hereinafter. The particles intervene between the sleeve and the mounting hole 2a, so that the pressing force is further increased, and this prevents smooth mounting of the pivot assembly bearing 1 to the mounting hole 2a. In addition, the particles are pushed out from the mounting hole 2a, and are held near an end surface of the sleeve, and as a result, they contaminate the hard disk drive unit D. In contrast, in the case in which the diameter size of the sleeve approximates the lower limit of the fabrication tolerance and the bore size of the mounting hole 1a approximates the upper limit of the fabrication tolerance, the pivot assembly bearing 1 may be misaligned in relation to the mounting hole 2a, since press-fit interference is insufficient. Therefore, in order to avoid the above problems only by adjusting the size, it would be necessary to set a very tight tolerance for the outer diameter of the sleeve and the inner diameter of the mounting hole 2a.

Thus, usually, a tolerance ring for compensating the rough fabrication tolerance has been inserted in the mounting hole of the swing arm, and the pivot assembly bearing has been pressed into the tolerance ring (for example, Japanese Patent Publication No. 2004-513309 and Japanese Unexamined Patent Application Publication No. 2007-305268). The tolerance ring is a metallic member in which convex portions protruding in a radial direction are successively formed in the circumferential direction. When the pivot assembly bearing is pressed into the tolerance ring, the tolerance ring is expanded in the radial direction and the convex portions are pressed against the inner circumferential surface of the mounting hole. Consequently, the tolerance ring is elastically deformed. By this elastic deformation, the fabrication tolerance between the sleeve and the mounting hole is compensated. Moreover, as the mounting hole inner surface is pressed by the reactive force due to the elastic deformation of the convex portion, the sleeve is fixed to the mounting hole. Therefore, although the fitting size of the sleeve and the mounting hole is not strictly set, a suitable fitting condition can be obtained.

However, when the pivot assembly bearing is pressed into the tolerance ring, large pressing force is also required, and moreover, the particles are generated by chipping away the outer circumferential surface of the sleeve. Therefore, the above problems still remain, even when the tolerance ring is used.

SUMMARY OF THE INVENTION

The present invention was conceived considering the above problems, and the object thereof is to provide a pivot assembly bearing which can reduce the pressing force when it is pressed into the mounting hole of the swing arm, and which can prevent the generation of particles on the outer circumferential surface of the sleeve of the pivot assembly bearing.

The pivot assembly bearing according to the present invention comprises a shaft portion, and an outer circumferential member rotatably supported around the shaft portion, wherein a plurality of grooves extending along a circumferential direction are successively formed in an axial direction on an outer circumferential surface of the outer circumferential member, and a surface roughness of the outer circumferential surface of the outer circumferential member is in a range of 0.5 to 8 μm in terms of center line average roughness (Ra) and in a range of 5 to 30 μm in terms of maximum height (Rmax).

Conventionally, it was considered that a smoother outer circumferential surface of the outer circumferential member would be more advantageous because the frictional resistance at the mounting hole of the swing arm would be lower. Therefore, the outer circumferential surface of the outer circumferential member was finished by turning at a degree in which the tool marks formed by cutting tool could not be identified visually (a degree in which unevenness could not be detected by touching with finger), or it was finished by grinding after turning. Additionally, the conventional outer circumferential surface of the outer circumferential member was finished to a surface roughness Ra of 0.05 to 0.15 μm and Rmax of 0.5 to 2.0 μm.

In the present invention, the surface roughness of the outer circumferential surface of the outer circumferential member is set to a range of 0.5 to 8 μm in center line average roughness (Ra) and a range of 5 to 30 μm in maximum height (Rmax) by providing successive grooves on the outer circumferential surface of the outer circumferential member. By providing the fine unevenness on the outer circumferential surface of the outer circumferential member as described above, the contact area between the outer circumferential surface of the outer circumferential member and the mounting hole of the swing arm is reduced, and therefore, the frictional resistance between them can be reduced. Thus, the pressing force to insert the pivot assembly bearing into the mounting hole of the swing arm can be reduced. In addition, galling between the outer circumferential member and the mounting hole is reduced with the reduction of the frictional resistance between them, and generation of particles from the outer circumferential surface of the outer circumferential member is decreased. Furthermore, even if the particles are generated by chipping away the outer circumferential surface of the outer circumferential member, the particles may be held in the grooves, and therefore, the problems like the particles being sandwiched between the outer circumferential member and the mounting hole or being released from the mounting hole and becoming a source of contaminants can be prevented.

The above effects are not limited to the case in which the outer circumferential member of the pivot assembly bearing is directly pressed into the mounting hole of the swing arm. They can be similarly obtained in the case where a tolerance ring is inserted in the mounting hole, and the outer circumferential member is pressed into the tolerance ring.

Here, a groove depth in a range of 0.01 to 0.03 mm is preferable. In addition, a groove width in a range of 0.05 to 0.15 mm is desirable. Furthermore, a space between grooves in a range of 0.1 to 0.2 mm is desirable. By defining such a groove size, the capacity for holding the generated particles in the grooves can be reliably ensured.

The groove can be formed in an annular shape on the outer circumferential surface of the outer circumferential member. Alternatively, it can be formed in a spiral shape toward the axial direction. In addition, the groove can be formed over the entire surface of the outer circumferential surface of the outer circumferential member, or it can be formed only on the intermediate portion of the outer circumferential member excluding both ends of the outer circumferential member. Furthermore, recess portions in which depth and width thereof are greater than those of the groove can be formed in an annular shape on the outer circumferential surface of the outer circumferential member. The recess portion functions as a holding space for the particle, and moreover, decreases the pressing force during press fitting by reducing the contact area with the mounting hole.

The groove can be formed by turning, and a desired groove can be formed as a tool mark of a cutting tool by properly setting the feed ratio and cutting depth of the cutting tool. In this case, a cross-sectional shape of the groove is approximately an arc, and a sharpened portion is formed at a boundary of the grooves. Therefore, it is preferable that a flat portion be formed by removing the sharpened portion. Thereby, the pressing force during press fitting is further decreased, and moreover, it becomes more difficult to generate the particles. The flat portion can be formed by, for example, centerless grinding (polishing). Alternatively, the groove can be formed also by rolling.

In the pivot assembly bearing according to the present invention, the pressing force when it is pressed into a mounting hole of a swing arm can be decreased, and generation of particles when the outer circumferential member is cut by the friction with the inner surface of the mounting hole, can be decreased. Therefore, the pivot assembly bearing can be smoothly mounted to the swing arm, and the contamination of the hard disk drive unit caused by the particles can be prevented.

BRIEF DESCRIPTION OF THE DRAWINGS

FIG. 1 is a perspective view showing a pivot assembly bearing and a swing arm.

FIG. 2 is a cross sectional view showing a pivot assembly bearing.

DESCRIPTION OF PREFERRED EMBODIMENTS

Figure 3A:
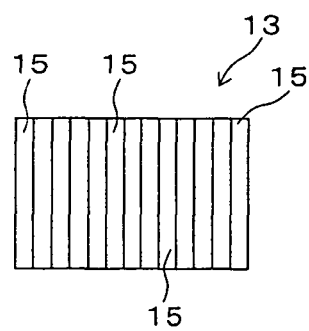
FIGS. 3A, 3B, 3C and 3D are side views showing different embodiments of a sleeve for pivot assembly bearings.

FIG. 1A shows a pivot assembly bearing 10 according to an embodiment of the present invention, and a metallic swing arm 20 in which the pivot assembly bearing 10 is mounted. A mounting hole 22, which passes through in a vertical direction, is formed at a base portion 21 of the swing arm 20, and a pair of arm portions 23 is extended from the base portion 21. A magnetic head, which reads and writes information in a hard disk drive unit, is mounted at a tip portion of the arm portion 23. In addition, a supporting portion 24 extending to an opposite side of the arm portion 23 is provided at the base portion 21, and the swing arm 20 is swung by driving the supporting portion 24 using a driving mechanism provided in the hard disk drive unit.

A tolerance ring 30 is inserted in the mounting hole 22 of the swing arm 20, and the pivot assembly bearing 10 is pressed into the tolerance ring 30. The tolerance ring 30 is a metallic member including a ring portion 31 and a pressing portion 32 extending from the ring portion to an axial direction. The pressing portion 32 is formed by a plurality of rectangular pieces 33, and a portion having no rectangular piece 33 is provided at one part in a circumferential direction. Convex portions which protrude in a radial direction (not shown) are provided on each rectangular piece 33, and when the pivot assembly bearing 10 is pressed into, the pivot assembly bearing 10 is fixed to the mounting hole 22 by expanding the tolerance ring 30 and pressing the convex portions to the inner circumferential surface of the mounting hole 22.

The pivot assembly bearing 10 has a shaft (a shaft portion) 12. The shaft 12 is rotatably held by a pair of ball bearings 11 which are placed at an upper portion and a lower portion, respectively. That is, the ball bearings 11 hold rolling elements 11c (11e) between inner rings 11b (11d) and outer rings 11a (11f). Then, the inner rings 11b and 11d are fixed to an outer circumferential surface of the shaft 12, and the outer rings 11a and 11f are fixed to inside of a metallic cylindrical sleeve (an outer circumferential member) 13. In addition, lubricants such as a lubricating grease, a lubricating oil, etc., are filled in a clearance between the inner rings 11b (11d) and the outer rings 11a (11f) and a circumference of the rolling elements 11c (11e).

The shaft 12 has a lower end side (downward in the figure) and an upper end side (upward in the figure), and a flange 12a having an outer diameter which is smaller than an inner diameter of the sleeve 13 is formed at the lower end side of the shaft 12 which is fixed to a supporting portion arranged at a base of the hard disk drive unit. The outer diameter of the flange 12a may be of any size as long as the flange 12a can contact the inner ring 11d to apply a preload. However, the outer diameter of the flange 12a is desirable to be equal to the outer diameter of the inner ring 11d, and it is more desirable to be slightly larger than the outer diameter of the inner ring 11d, since material is wasted if the outer diameter of the flange 12a is excessively large.

On an inner circumferential surface of the sleeve 13, a spacer 14 which contacts the end surfaces of the outer rings 11a and 11f is provided, in order to position the pair of ball bearings 11 placed at the upper portion and the lower portion, respectively, so as to separate them in an axial direction. It should be noted that the sleeve 13 and the spacer 14 are not limited to a configuration formed integrally in a single piece as shown in FIG. 2, and the sleeve 13 and the spacer 14 may be separated parts.

As shown in FIG. 3A, a plurality of grooves 15 are successively formed in the axial direction on the outer circumferential surface of the sleeve 13. As a result, the surface roughness of the outer circumferential surface of the sleeve 13 is Ra 0.5 to 8 μm in terms of center line average roughness and Rmax 5 to 30 μm in terms of maximum height. In addition, the depth of the groove 15 is 0.01 to 0.03 mm, and the width of the groove 15 in the axial direction is 0.1 to 0.15 mm, and the intervals of the grooves are 0.1 to 0.15 mm. The groove 15 is formed in an annular shape on the outer circumferential surface of the sleeve 13, as shown in FIG. 3A. It should be noted that the aspect shown in FIG. 3A may be changed to a spiral shape as shown in FIG. 3D by inclining the direction of the grooves 15 to the axial direction. Furthermore, although not shown, chamfering (convex surface or slope) of about 0.2 to 0.4 mm is formed at the edges of both end surfaces of the sleeve 13.

Figure 4:
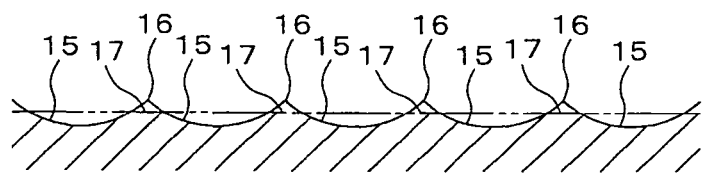
FIG. 4 is a cross sectional view of a surface portion of a sleeve showing the groove shape.
Figure 5:
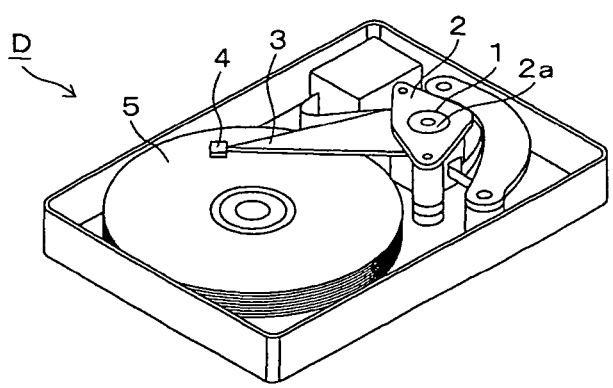
FIG. 5 is a perspective view showing a conventional hard disk drive unit.

FIG. 4 is a cross sectional view showing the groove 15 in detail. The groove 15 may be formed by rolling or turning. A cross-sectional shape of the groove 15 is approximately an arc, and a sharpened portion 16 is formed at a boundary of the grooves 15. A flat portion 17 may be formed by removing the sharpened portion 16 using cutting or grinding.

In the pivot assembly bearing 10 having the above structure, fine unevenness is provided by forming the grooves 15 on the outer circumferential surface of the sleeve 13. As a result, contact area between the outer circumferential surface of the sleeve 13 and the mounting hole 22 of the swing arm 20 decreases, and the frictional resistance between them is reduced. Therefore, the pressing force for pressing the pivot assembly bearing 10 into the mounting hole 22 is reduced. In addition, galling between the sleeve 13 and the mounting hole 22 is reduced by reducing the frictional resistance between them, and generation of particles originating from the outer circumferential surface of the sleeve 13 is reduced. Furthermore, even if the particles are generated by chipping away the outer circumferential surface of the sleeve 13, the particles may be held in the grooves 15, and therefore, the problems like the particles being sandwiched between the sleeve 13 and the mounting hole 22 or being released from the mounting hole 22 and becoming a contamination source can be prevented.

Therefore, in the pivot assembly bearing 10 having the above structure, the pivot assembly bearing can be smoothly mounted to the swing arm, and the contamination of the hard disk drive unit by the particles can be prevented in advance. It should be noted that the above actions and effects can be similarly obtained in the case in which the tolerance ring 30 is inserted in the mounting hole of the swing arm 20, and the sleeve 13 is pushed into the tolerance ring 30.

Figure 3C:
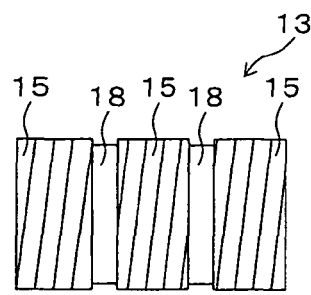
Figure 3B:
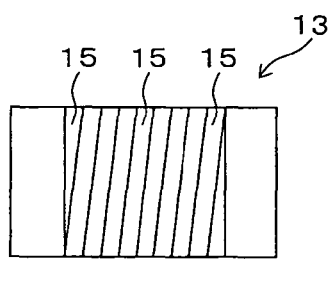
Figure 3D:
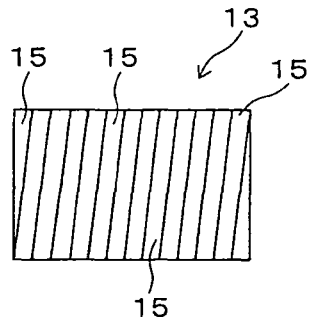

FIGS. 3B and 3C show alternative examples of the above embodiment. The alternative example shown in FIG. 3B is a pivot assembly bearing in which spiral grooves 15 are formed only on an intermediate portion excluding both end portions of the sleeve 13. The alternative example shown in FIG. 3C is a pivot assembly bearing provided with recess portions 18 formed in an annular shape on the outer circumferential surface of the sleeve 13 in which the depth and width thereof are larger than those of the groove 15. The recess portion 18 can function as a holding space of the particle, and moreover, the pressing force for press fitting can be further decreased by reducing the contact area between the mounting hole 22.

EXAMPLES

In the following, the present invention will be explained in more detail by referring to Examples and Comparative Examples.

Example 1

A spiral groove was formed by carrying out turning on the outer circumferential surface of a sleeve, and the surface roughness of the outer circumferential surface was set to Ra 2.0 μm and Rmax 12 μm. A pivot assembly bearing was assembled by using the sleeve and was pressed into the mounting hole of a swing arm. As a result, the pressing force was 19.87 kgf and generation of particles was not observed.

Example 2

A spiral groove was formed by carrying out turning on the outer circumferential surface of a sleeve having the same outer diameter as that of Example 1, and the surface roughness of the outer circumferential surface was set to Ra 6.0 μm and Rmax 22 μm. A pivot assembly bearing was assembled by using the sleeve and was pressed into the mounting hole of a swing arm. As a result, the pressing force was 52.93 kgf and generation of particles was not observed.

Comparative Example 1

A pivot assembly bearing was assembled by using a sleeve in which the surface roughness of the outer circumferential surface was Ra 0.1 μm and Rmax 1.3 μm and the outer diameter was the same to that of Example 1, and was pressed into the mounting hole of a swing arm. As a result, the pressing force was 57.63 kgf and generation of particles was observed.

Comparative Example 2

A pivot assembly bearing was assembled by using a sleeve similar to that of Comparative Example 1 except that the outer diameter was made 5 μm smaller, and was pressed into a mounting hole of a swing arm. As a result, the pressing force was 58.30 kgf and generation of particles was observed.

Comparative Example 3

A pivot assembly bearing was assembled by using a sleeve similar to that of Comparative Example 1 except that grooves were formed at adjoining positions of both ends, and was pressed into the mounting hole of a swing arm. As a result, the pressing force was 57.73 kgf and generation of particles was observed.

As described above, in Examples 1 and 2 of the present invention, the pressing force was less than in Comparative Example 2 in which the outer diameter was 5 μm smaller, and moreover, the particles were not generated. Therefore, it is clear that the present invention has superior advantage.

The present invention can be used to various products using a pivot assembly bearing such as a hard disk drive unit.

What is claimed is:
1. A pivot assembly bearing comprising:
a shaft portion; and
an outer circumferential member rotatably supported around the shaft portion,
wherein a plurality of grooves extending along a circumferential direction are successively formed in an axial direction on an outer circumferential surface of the outer circumferential member, and
a surface roughness of the outer circumferential surface of the outer circumferential member is in a range of 0.5 to

8 μm in terms of center line average roughness (Ra) and in a range of 5 to 30 μm in terms of maximum height (Rmax).

2. The pivot assembly bearing according to claim 1, wherein a depth of a groove of the plurality of grooves is in a range of 0.01 to 0.03 mm.

3. The pivot assembly bearing according to claim 1, wherein a width of a groove of the plurality of grooves is in a range of 0.05 to 0.15 mm.

4. The pivot assembly bearing according to claim 1, wherein an interval between consecutive grooves of the plurality of grooves is in a range of 0.1 to 0.2 mm.

5. The pivot assembly bearing according to claim 1, wherein a groove of the plurality of grooves is formed in an annular shape on the outer circumferential surface of the outer circumferential member.

6. The pivot assembly bearing according to claim 1, wherein a groove of the plurality of grooves is formed in a spiral shape in an axial direction.

7. The pivot assembly bearing according to claim 6, wherein the groove is a tool mark formed by turning.

8. The pivot assembly bearing according to claim 7, wherein a flat portion is formed at an intersection area of consecutive grooves of the plurality of grooves.

9. The pivot assembly bearing according to claim 6, wherein the groove is formed by rolling.

10. The pivot assembly bearing according to claim 1, wherein the plurality of grooves are formed over the entire surface of the outer circumferential surface of the outer circumferential member.

11. The pivot assembly bearing according to claim 1, wherein a groove of the plurality of grooves is formed on an intermediate portion of the outer circumferential member excluding both end parts of the outer circumferential member.

12. The pivot assembly bearing according to claim 1, wherein at least one recess portion having depth and width greater than those of a groove of the plurality of grooves is formed in an annular shape on the outer circumferential surface of the outer circumferential member.

13. A pivot assembly bearing comprising:
a shaft portion; and
an outer circumferential member rotatably supported around the shaft portion,
wherein a spiral groove is formed around an axial direction on an outer circumferential surface of the outer circumferential member, and
a surface roughness of the outer circumferential surface of the outer circumferential member is in a range of 0.5 to 8 μm in terms of center line average roughness (Ra) and in a range of 5 to 30 μm in terms of maximum height (Rmax).

14. The pivot assembly bearing according to claim 13, wherein a depth of the spiral groove is in a range of 0.01 to 0.03 mm.

15. The pivot assembly bearing according to claim 13, wherein a width of the spiral groove is in a range of 0.05 to 0.15 mm.

16. The pivot assembly bearing according to claim 13, wherein the groove is formed over the entire surface of the outer circumferential surface of the outer circumferential member.

17. The pivot assembly bearing according to claim 13, wherein the spiral groove is formed on the outer circumferential member excluding both end parts of the outer circumferential member.

18. The pivot assembly bearing according to claim 13, wherein the spiral groove is followed by an annular recess portion having depth and width greater than those of the spiral groove.

19. The pivot assembly bearing according to claim 13, wherein the groove is formed by turning or rolling.

* * * * *